(12) United States Patent  (10) Patent No.: US 6,551,696 B2
Usui  (45) Date of Patent: Apr. 22, 2003

(54) INTERLEAF SHEET FOR PLANOGRAPHIC PRINTING PLATES, ABUTTING MEMBER FOR PLANOGRAPHIC PRINTING PLATES, AND PACKAGING STRUCTURE FOR PLANOGRAPHIC PRINTING PLATES

(75) Inventor: Takayuki Usui, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/797,774

(22) Filed: Mar. 5, 2001

(65) Prior Publication Data

US 2001/0024731 A1 Sep. 27, 2001

(30) Foreign Application Priority Data

Mar. 3, 2000 (JP) ........................................ 2000-058515

(51) Int. Cl.$^7$ .................................................. B32B 3/00
(52) U.S. Cl. ........................ 428/195; 428/195; 428/206; 428/211; 428/537.5
(58) Field of Search .............................. 428/537.5, 195, 428/199, 206, 211

(56) References Cited

FOREIGN PATENT DOCUMENTS

| EP | 0425982 A2 | 10/1990 |
|---|---|---|
| EP | 0564947 A1 | 3/1993 |
| EP | 0564947 | * 10/1993 |
| EP | 0863255 A1 | 9/1998 |
| EP | 0863255 | * 9/1998 |
| EP | 0907107 | * 4/1999 |
| EP | 0907107 A2 | 4/1999 |
| EP | 0955564 | * 11/1999 |
| EP | 0955564 A2 | 11/1999 |
| JP | 8-3898 | 1/1996 |
| JP | 8-39958 | 2/1996 |

OTHER PUBLICATIONS

Patent Abstract of Japan, 08–003898, Jan. 9, 1996.

Patent Abstract of Japan, 08–039958, Feb. 13, 1996.

* cited by examiner

Primary Examiner—Leszek Kiliman
(74) Attorney, Agent, or Firm—Sughrue Mion, PLLC

(57) ABSTRACT

A protective cardboard for planographic printing plates has a cardboard main body, a moisture-proofing layer on both surfaces of the cardboard main body, and an adhering paper adhered onto the moisture-proofing layer. By the adhering paper contacting an interleaf sheet, a coefficient Y of static friction between the protective cardboard and the interleaf sheet is equal to or less than a coefficient X of static friction between the interleaf sheet and an image forming surface of the planographic printing paper (i.e., $Y \leq X$).

19 Claims, 3 Drawing Sheets

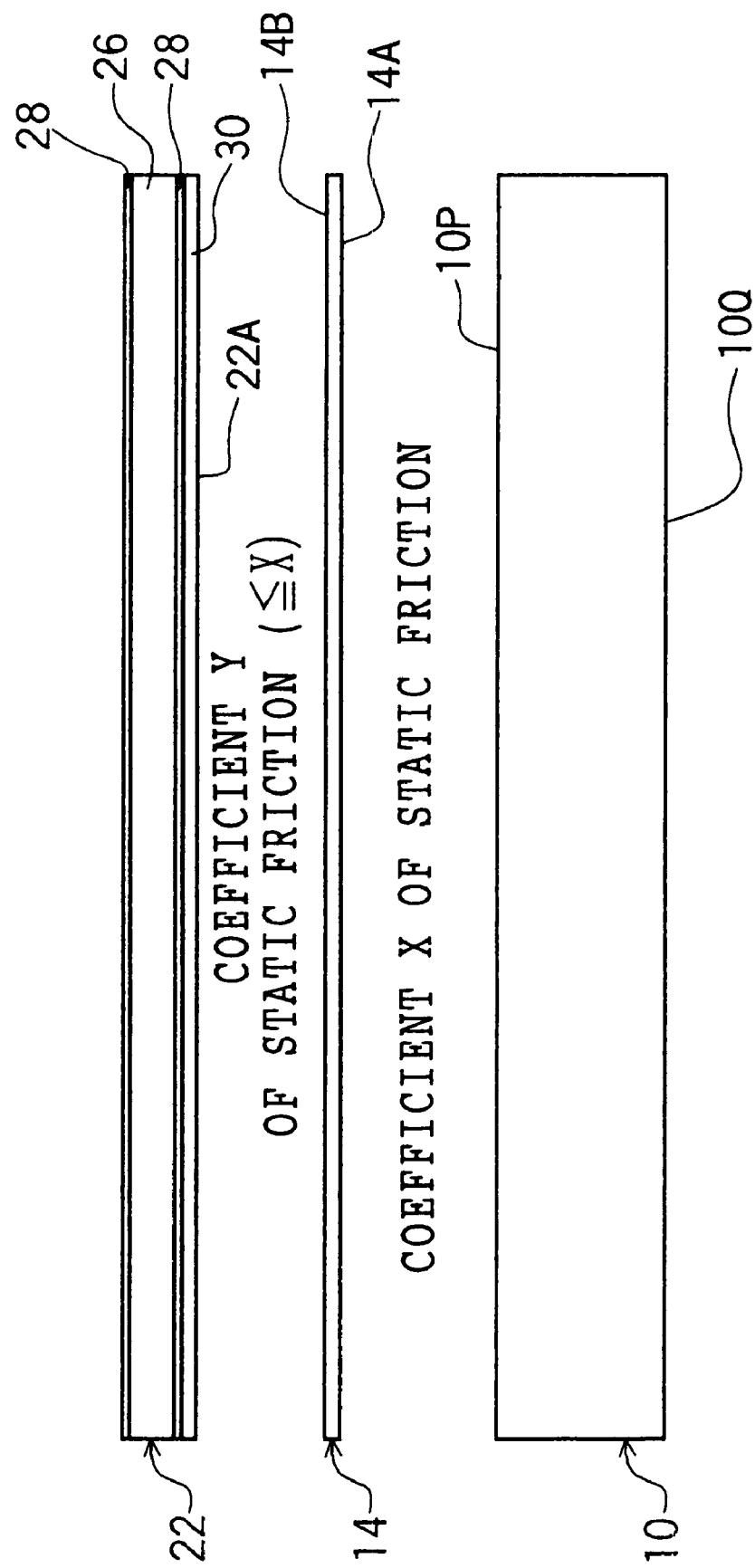

INTERLEAF SHEET FOR PLANOGRAPHIC PRINTING PLATES, ABUTTING MEMBER FOR PLANOGRAPHIC PRINTING PLATES, AND PACKAGING STRUCTURE FOR PLANOGRAPHIC PRINTING PLATES

BACKGROUND OF THE INVENTION

1. Field of the Invention

The present invention relates to an interleaf sheet for planographic printing plates, an abutting member for planographic printing plates, and a packaging structure for planographic printing plates.

2. Description of the Related Art

In recent years, planographic printing plates such as photosensitive printing plates and thermosensitive printing plates have been widely used in plate-making methods (including electrophotographic plate-making methods) in order to facilitate automation of plate-making processes. Planographic printing plates are generally manufactured in the following manner. On a support such as a sheet-configured or coiled aluminum plate, surface treatments such as graining, anodizing, a silicate treatment, and other chemical conversion treatments are carried out alone or in appropriate combination. Subsequently, processings for applying a photosensitive layer or a thermosensitive layer onto the support and drying the layer are carried out. (Hereinafter, these layers will be collectively referred to as "applied films", and surfaces of supports with and without an applied film formed thereon are referred to as an "image forming surface" and a "non-image forming surface", respectively.) Then, the support with the layer applied thereon is cut into a desired size.

The planographic printing plate manufactured in this manner is subjected to plate-making processings such as exposure, development, gum coating, and the like. Subsequently, the planographic printing plate is set in a printing machine, and ink is applied onto the planographic printing plate, thereby printing characters, images, or the like on papers.

In order to protect the applied film of a planographic printing plate, sometimes a sheet of paper called an "interleaf sheet" is made to contact the image forming surface (i.e., the applied film). Particularly, in order to efficiently handle planographic printing plates, a plurality of planographic printing plates may sometimes be stacked in a thickness direction to form a stacked sheaf. In this case, the image forming surface (i.e., the applied film) is often protected by forming a stacked sheaf by, for example, alternatingly stacking the interleaf sheet described above and the planographic printing plate so that the interleaf sheet contacts the image forming surface, and by placing a protective cardboard on an end surface of the planographic printing plate in a stacking direction or placing it on every predetermined number of planographic printing plates.

However, in such a stacked sheaf, when a coefficient of static friction between the image forming surface of the planographic printing plate and the interleaf sheet or a coefficient of static friction between the interleaf sheet and the protective cardboard is small, the stacked sheaf may become disordered due to vibration or the like during transportation or the like of the stacked sheaf, or the interleaf sheet or the protective cardboard may be horizontally displaced relative to the planographic printing plate (i.e., displacement along the image forming surface of the planographic printing plate), thereby causing damage to the image forming surface.

Further, recently used are planographic printing plates of a photosensitive or thermosensitive type on which an image is formed with a laser (hereinafter referred to as a "laser exposure type"). With such laser exposure type planographic printing plates, when the protective cardboard described above is used to form a stacked sheaf, depending on the characteristics of the planographic printing plate, moisture contained in the protective cardboard may cause the applied film to deteriorate. For this reason, a protective cardboard having a moisture-proofing layer may be used as needed. Often used is a structure in which a layer of low density polyethylene (LDPE) serving as the moisture-proofing layer is adhered to a generally used protective cardboard.

However, when the stacked sheaf which is formed by using such a protective cardboard with the LDPE layer adhered thereon is handled, since the coefficient of static friction between the LDPE layer and the interleaf sheet is large relative to the coefficient of static friction between the interleaf sheet and the image forming surface of the planographic printing plate, the interleaf sheet and the protective cardboard are together displaced horizontally relative to the planographic printing plate by vibration or the like during handling. The image forming surface may be subject to damage due to this horizontal displacement.

SUMMARY OF THE INVENTION

In view of the above-described facts, it is an object of the present invention to obtain an interleaf sheet for planographic printing plates, an abutting member for planographic printing plates, and a packaging structure for planographic printing plates which can prevent horizontal displacement of an interleaf sheet for a planographic printing plate relative to an image forming surface of a planographic printing plate and can reliably prevent damage to the image forming surface.

In accordance with a first aspect of the present invention, there is provided an interleaf sheet for planographic printing plates, comprising: a planographic printing plate contacting surface which contacts an image forming surface of a planographic printing plate with an applied film formed thereon in a state in which the planographic printing plate is packaged; and an abutting member contacting surface which contacts an abutting member for planographic printing plates which is disposed at a side that is opposite to a side of the planographic printing plate contacting surface, wherein surface properties of the planographic printing plate contacting surface and the abutting member contacting surface are respectively determined so that a coefficient of static friction between the abutting member for planographic printing plates and the abutting member contacting surface is no more than a coefficient of static friction between the planographic printing plate contacting surface and the image forming surface.

In other words, in the interleaf sheet for planographic printing plates according to the first aspect, in a state in which the planographic printing plate is packaged, the planographic printing plate contacting surface contacts and thereby protects the image forming surface (i.e., the applied film) of the planographic printing plate.

Further, by the abutting member for planographic printing plates being disposed on the surface opposite to the planographic printing plate contacting surface in a state in which the planographic printing plate is packaged, the abutting member for planographic printing plates is made to contact the abutting member contacting surface.

In the interleaf sheet for planographic printing plates according to the present invention, the surface properties of the planographic printing plate contacting surface and the abutting member contacting surface are set so that the coefficient of static friction between the abutting member for planographic printing plates and the abutting member contacting surface is equal to or less than the coefficient of static friction between the planographic printing plate contacting surface and the image forming surface. For this reason, for example, when horizontal displacement between the abutting member for planographic printing plates and the planographic printing plate is caused by external force, vibration, or the like during handling or the like, the interleaf sheet for planographic printing plates is not horizontally displaced relative to the planographic printing plate. Therefore, damage otherwise caused to the image forming surface by horizontal displacement of the interleaf sheet for planographic printing plates relative to the planographic printing plate can be reliably prevented.

In accordance with a second aspect of the present invention, there is provided an abutting member for planographic printing plates which, in a state in which an interleaf sheet for planographic printing plates is in contact with an image forming surface of a planographic printing plate with an applied film thereon, protects the planographic printing plate by contacting the surface of the interleaf sheet for planographic printing plates opposite to the surface which contacts the image forming surface of the planographic printing plate, the abutting member for planographic printing plates comprising: an interleaf sheet contacting surface whose properties are determined such that a coefficient of static friction between the interleaf sheet for planographic printing plates and the abutting member for planographic printing plates is no more than a coefficient of static friction between the image forming surface of the planographic printing plate and the interleaf sheet for planographic printing plates.

That is, the abutting member for planographic printing plates according to the second aspect contacts, of the surfaces of the interleaf sheet for planographic printing plates, the surface which is opposite to the surface in contact with the image forming surface of the planographic printing plate, and thereby protects the planographic printing plate.

The surface properties of the abutting member for planographic printing plates are set so that the coefficient of static friction between the interleaf sheet for planographic printing plates and the abutting member for planographic printing plates is equal to or less than the coefficient of static friction between the image forming surface of the planographic printing plate and the interleaf sheet for planographic printing plates. For this reason, for example, when horizontal displacement between the abutting member for planographic printing plates and the planographic printing plate is caused by external force, vibration, or the like during handling or the like, the interleaf sheet for planographic printing plates is not horizontally displaced relative to the planographic printing plate. Therefore, damage otherwise caused to the image forming surface by horizontal displacement of the interleaf sheet for planographic printing plates relative to the planographic printing plate can be reliably prevented.

In the abutting member for planographic printing plates according to the present invention, the interleaf sheet contacting surface is preferably formed by adhering an adhering member onto an abutting member main body which forms the abutting member for planograhic printing plates. The adhering member has, with respect to the interleaf sheet for planographic printing plates, a coefficient of static friction no more than a coefficient of static friction between the image forming surface and the interleaf sheet for planographic printing plates.

In other words, the adhering member has, with respect to the interleaf sheet for planographic printing plates, a coefficient of static friction which is equal to or less than the coefficient of static friction between the image forming surface of the planographic printing plate and the interleaf sheet for planographic printing plates. Accordingly, by merely disposing the abutting member for planographic printing plates with such an adhering member adhered thereon so that the adhering member contacts the interleaf sheet for planographic printing plates, horizontal displacement of the interleaf sheet for planographic printing plates relative to the planographic printing plate can be prevented. Further, since the adhering member is merely adhered onto a conventionally used abutting member for planographic printing plates, manufacturing cost is not increased.

The adhering member is not particularly limited as long as the surface properties thereof have the aforementioned coefficient of static friction with respect to the interleaf sheet for planographic printing plates. However, for example, the adhering member can be an adhering paper which has the same structure as that of the interleaf sheet for planographic printing plates which protects the image forming surface of the planographic printing plate. In this way, a new member need not be prepared for the adhering member, and generally used interleaf sheets for planographic printing plates can be used. Therefore, the abutting member for planographic printing plates can be manufactured at a lower cost. Further, in this case, for example, if the adhering paper is adhered onto the abutting member main body in such a manner that the surface of the adhering paper which has a relatively smaller coefficient of static friction with respect to the interleaf sheet for planographic printing plates contacts the interleaf sheet for planographic printing plates, the coefficient of static friction between the abutting member for planographic printing plates and the interleaf sheet for planographic printing plates is further decreased.

In accordance with a third aspect of the present invention, there is provided a packaging structure for planographic printing plates, comprising: a planographic printing plate; an interleaf sheet for planographic printing plates which is made to contact an image forming surface of the planographic printing plate with an applied film formed thereon; and a protecting member for planographic printing plates which protects the planographic printing plate by being made to contact a surface of the planographic printing plate opposite to the image forming surface, wherein a coefficient of static friction between the protecting member for planographic printing plates and the interleaf sheet for planographic printing plates is set so as to be no more than a coefficient of static friction between the planographic printing plate and the interleaf sheet for planographic printing plates.

That is, in this packaging structure for planographic printing plates, the image forming surface (i.e., the applied film) of the planographic printing plate is protected by contacting the interleaf sheet for planographic printing plates.

Moreover, the protecting member for planographic printing plates contacts the interleaf sheet for planographic printing plates at the surface thereof which is opposite to the surface in contact with the planographic printing plate. Therefore, deformation of the planographic printing plate or damage thereto is prevented.

The interleaf sheet for planographic printing plates and the protecting member for planographic printing plates are structured such that the coefficient of static friction between the protecting member for planographic printing plates and the interleaf sheet for planographic printing plates is equal to or less than the coefficient of static friction between the planographic printing plate and the interleaf sheet for planographic printing plates. For this reason, for example, when horizontal displacement between the protecting member for planographic printing plates and the planographic printing plate is caused by external force, vibration, or the like during handling or the like, the interleaf sheet for planographic printing plates is not horizontally displaced relative to the planographic printing plate. Therefore, damage otherwise caused to the image forming surface by horizontal displacement of the interleaf sheet for planographic printing plates relative to the planographic printing plate can be reliably prevented.

The protecting member for planographic printing plates is not particularly limited as long as it can prevent deformation of the planographic printing plate or damage thereto. For example, the aforementioned abutting member for planographic printing plates can be used as the protecting member for planographic printing plates.

In the packaging structure for planographic printing plates according to the present invention, the coefficient Y of static friction between the protecting member for planographic printing plates and the interleaf sheet for planographic printing plates, and the coefficient X of static friction between the planographic printing plate and the interleaf sheet for planographic printing plates are preferably 0.37 or more.

As described above, by the coefficient Y of static friction between the protecting member for planographic printing plates and the interleaf sheet for planographic printing plates, and the coefficient X of static friction between the planographic printing plate and the interleaf sheet for planographic printing plates being 0.37 or more, damage otherwise caused to the image forming surface of the planographic printing plate can be reliably prevented. Further, disorder of the packaging structure for planographic printing plates can also be prevented.

BRIEF DESCRIPTION OF THE DRAWINGS

FIG. 3 is a cross-sectional view showing a state in which the planographic printing plates have been packaged together with the abutting members for planographic printing plates according to the embodiment of the present invention.

DESCRIPTION OF THE PREFERRED EMBODIMENTS

Figure 1:
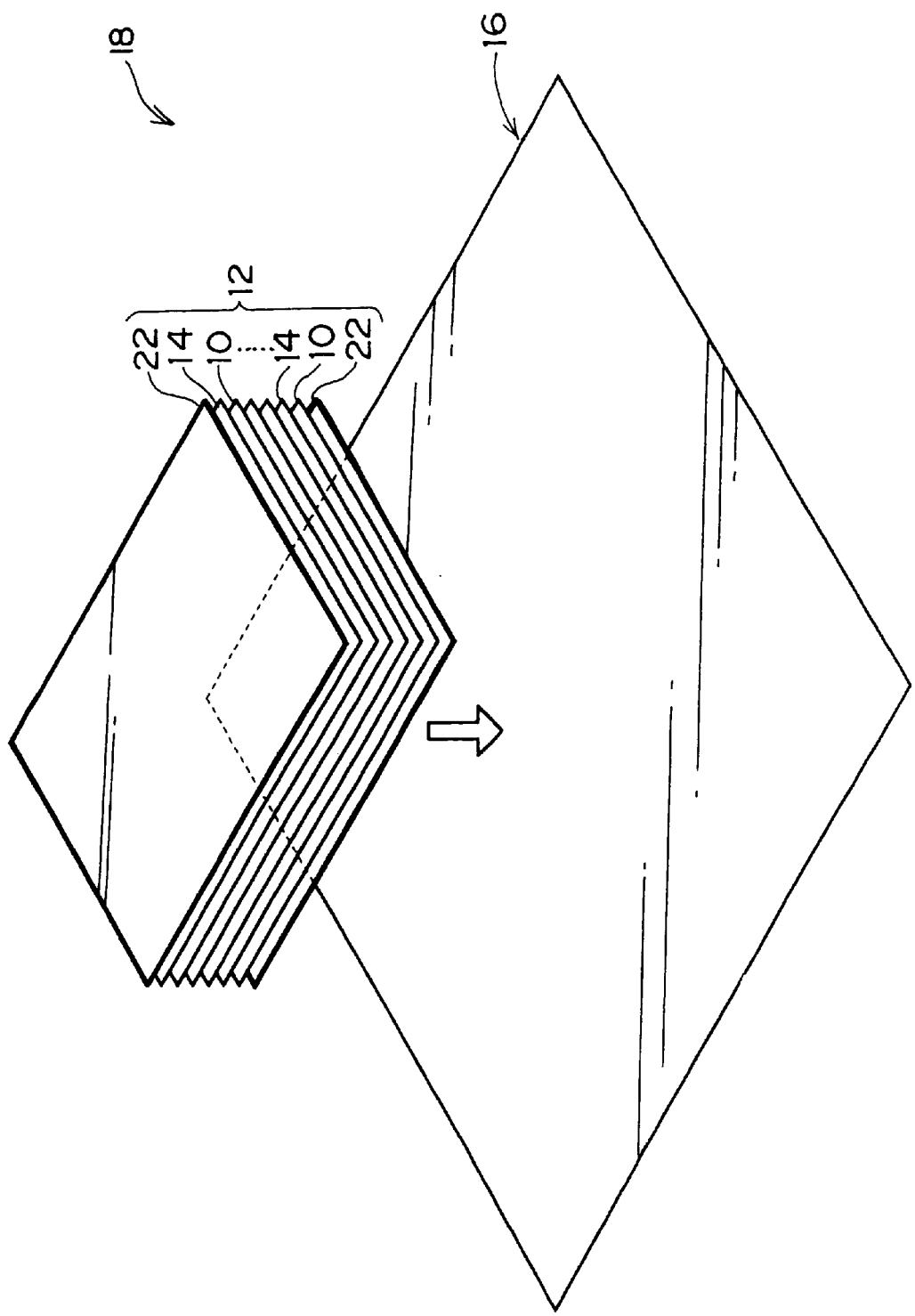
FIG. 1 is a perspective view showing a step in a process of packaging planographic printing plates together with abutting members for planographic printing plates according to an embodiment of the present invention.

FIG. 1 shows a stacked sheaf 12 of planographic printing plates 10 which includes protective cardboards 22 (i.e., abutting members for planographic printing papers) in accordance with an embodiment of the present invention.

The planographic printing plate 10 is formed by applying a film (a photosensitive layer in the case of a photosensitive printing plate, or a thermosensitive layer in the case of a thermosensitive printing plate) on a thin aluminum support which is formed in a rectangular plate-like configuration. Plate-making processings such as exposure, development, gum coating, and the like are carried out on the applied film of the planographic printing plate 10. Then, the processed planographic printing plate 10 is set in a printing machine, and by applying ink onto the printing plate 10, characters, images, and the like are printed on a paper. Hereinafter, the surface of the planographic printing paper 10 with an applied film applied thereon is referred to as an image forming surface 10P, while the surface opposite to the image forming surface 10P, i.e., the surface of the planographic printing paper 10 without the applied film applied thereon, is referred to as a non-image forming surface 10Q. Further, the planographic printing plate 10 of the present embodiment is one before the processings (such as exposure, development, and the like) necessary for printing are carried out. The planographic printing plate 10 may be referred to as a planographic printing original plate or a planographic printing plate material as needed.

A specific structure of the planographic printing plate 10 is not limited as long as it has the above-mentioned structure. For example, by manufacturing planographic printing plates for plate printing with a laser in a heat mode system or a photon system, it is possible to provide planographic printing plates which can be made directly from digital data.

Further, the planographic printing plate 10 which can be applied for various plate-making methods can be provided by selecting various components in the photosensitive layer or the thermosensitive layer. Specific examples of the planographic printing plate 10 according to the present invention may include the following (1) to (11).

(1) A planographic printing plate whose photosensitive layer contains a compound which generates acid in the presence of an infrared absorption agent and heat and a compound in which crosslinking is formed by an acid.

(2) A planographic printing plate whose photosensitive layer contains a compound which becomes soluble in alkali in the presence of an infrared absorption agent and heat.

(3) A planographic printing plate whose photosensitive layer is comprised of two layers, i.e., an oxygen cutoff layer and a layer which contains a compound generating a radical by irradiation of a laser beam, a binder which is soluble in alkali, and a multifunctional monomer or prepolymer.

(4) A planographic printing plate whose photosensitive layer is comprised of two layers, i.e., a physical development core layer and a silver halide emulsion layer.

(5) A planographic printing plate whose photosensitive layer is comprised of three layers, i.e., a polymerization layer containing a multifunctional monomer and a multifunctional binder, a layer containing silver halide and a reducing agent, and an oxygen cutoff layer.

(6) A planographic printing plate whose photosensitive layer is comprised of two layers, i.e., a layer containing novorak resin and naphtoquinonediazide, and a layer containing silver halide.

(7) A planographic printing plate whose photosensitive layer contains an organic photoconductor.

(8) A planographic printing plate whose photosensitive layer is comprised of two to three layers, i.e., a laser beam absorbing layer which is removed by irradiation of a laser beam, a lipophilic layer and/or a hydrophilic layer.

(9) A planographic printing plate whose photosensitive layer contains a compound which absorbs energy to generate acid, a high molecular compound which has, at a side chain thereof, a functional group which generates sulphonic acid or carboxylic acid in the presence of an acid, and a compound which imparts energy to an acid generating agent by absorbing visible light.

(10) A planographic printing plate whose photosensitive layer contains a quinondiazide compound and novorak resin.
(11) A planographic printing plate whose photosensitive layer contains a compound which is decomposed by light or ultraviolet light and forms a crosslinking structure in itself or with other molecules within the layer, and a binder which is soluble in alkali.

Particularly, planographic printing plates to which a highly photosensitive film which is exposed by a laser is applied, and thermosensitive planographic printing plates have been used in recent years (for example, the planographic printing plates of the above (1) to (3), and the like). As explained later, when these planographic printing plates are used, damage to the image forming surface 10P can be reliably prevented.

As can be also seen in FIG. 1, the stacked sheaf 12 of the planographic printing plates 10 is structured by alternately stacking, in the thickness direction, the planographic printing plate 10 and an interleaf sheet 14 which protects the image forming surface 10P (i.e., the applied film), and by further disposing a protective cardboard 22 on the end surfaces of the stack in a stacking direction (i.e., on the uppermost surface and the lowermost surface of the stack in FIG. 1). Therefore, as shown in FIG. 3, the surface of the interleaf sheet 14 which contacts the image forming surface 10P is a planographic printing plate contacting surface 14A, while the surface of the interleaf sheet 14 opposite to the planographic printing plate contacting surface 14A is a protective cardboard contacting surface 14B which contacts the protective cardboard 22.

The number of the planographic printing plates 10 forming a sheaf 12 is not limited. However, from the viewpoint of efficiency of transportation and storage, the number may be 10 to 100, for example. When structured by 10 to 100 sheets of the planographic printing plates 10 in this manner, the sheaf 12 may be fastened as needed by an adhesive tape so that separation and transportation of the stacked sheaves 12 are facilitated. Further, it is also possible that the sheaf 12 is structured by a larger number of planographic printing plates 10 so as to transport and store the plates more efficiently (handling can be carried out fewer times). For example, the number of the planographic printing plates 10 may be around 3,000, and the protective cardboard 22 may be disposed on every 20 to 200 sheets of the planographic printing plates 10. Further, the number of the planographic printing plates 10 may be around 1,500, and the protective cardboard 22 may be disposed only on the uppermost surface and the lowermost surface of the stack.

Figure 2:
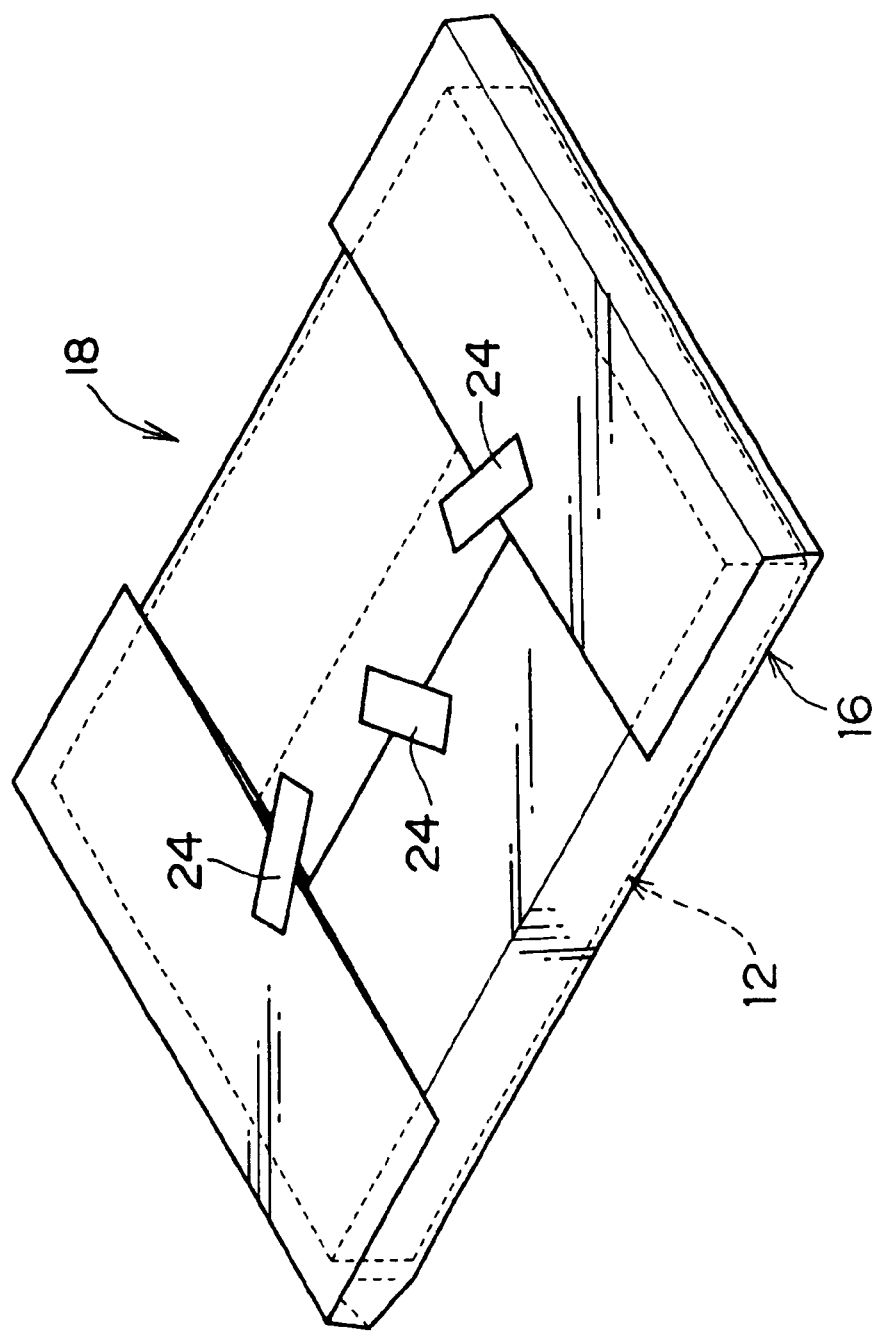
FIG. 2 is a perspective view showing a state in which the planographic printing plates have been packaged together with the abutting members for planographic printing plates according to the embodiment of the present invention.

Then, as shown in FIG. 2, the stacked sheaf 12 having the above structure is internally packaged in an internal packaging paper 16, and the internal packaging paper 16 is taped at predetermined positions by the adhesive tape 24. In this way, a packaging structure 18 of the planographic printing plates is structured. Since the internal packaging paper 16 is fastened so as not to spread or slip off inadvertently, the planographic printing plates 10 are reliably shielded from light and kept free from moisture by the internal packaging paper 16. Further, in accordance with the type of planographic printing plates 10, transportation methods, or the like, handling may be further facilitated by further externally packaging the stacked sheaf 12 in an external packaging box such as a corrugated cardboard box and loading the stacked sheaf 12 onto a loading member such as a pallet or a skid. (Materials for the loading member such as paper, resin, metal, and the like are not particularly limited.)

A specific structure of the interleaf sheet 14 is not particularly limited as long as it can protect the image forming surface 10P of the planographic printing plate 10. For example, paper containing 100% of wood pulp, paper not containing 100% of wood pulp but containing synthetic pulp, paper having a low density polyethylene layer formed on the surface of the above papers, and the like may be used. In particular, material cost is decreased for the paper not containing synthetic pulp, and therefore, the interleaf sheets 14 can be manufactured at a low cost. A more specific example of the interleaf sheet 14 is one which is made from bleached kraft pulp and has a basis weight of 30 to 45 g/m$^2$, a density of 0.7 to 0.85 g/cm$^3$, a moisture of 4 to 6%, and a PH of 4 to 6. However, the interleaf sheet 14 is not limited to the same.

The protective cardboard 22 of the present embodiment is formed by a cardboard main body 26 having sufficient strength to protect the planographic printing plate 10, moisture-proofing layers 28 laminated on the surfaces of the cardboard main body 26, and an adhering sheet 30 adhered to one surface or both surfaces (one surface in FIG. 3) of the moisture-proofing layer 28.

As for the material of the cardboard main body 26, wood pulp, natural fiber such as linen, synthetic pulp obtained from linear macromolecules such as polyolefin, regenerated cellulose, and the like can be used independenly, or a mixture of these materials can be used. Particularly, by selecting a low cost material such as wood pulp, natural fiber, and the like, the cardboard main body 26 can be manufactured at a low cost. A more specific example of the cardboard main body 26 is one having a density of 0.72 g/cm$^3$ and a basis weight of 640 g/m$^2$, which is obtained in the following manner. To paper material obtained by striking and breaking up used paper which serves as a raw material and diluting to a concentration of 4%, a sizing agent and a paper strengthening agent are added such that they are 0.1% and 0.2% of the total weight of the cardboard, respectively. Further, aluminum sulfate is added to the paper material until a PH thereof becomes 5.0, and the resulting paper material is used to make paper. Of course, the cardboard main body is not limited to this particular example.

Since the moisture-proofing layer 28 is formed of a material having low water permeability such as LDPE (low density polyethylene), moisture contained in the cardboard main body 26 itself does not affect the applied film of the planographic printing plate 10. Particularly, in the case of the laser-exposure type planographic printing plates which are recently used, it is preferable to use the protective cardboard 22 having the moisture-proofing layer 28 described above in order to prevent deterioration of the applied film due to moisture contained in the cardboard main body 26. Conversely, the applied film may not be affected by the moisture contained in the cardboard main body 26 (or the effect on the applied film may be extremely small) depending on the type of the applied film. In such a case, the moisture-proofing layer 28 may be omitted so that the protective cardboard 22 is manufactured at a low cost.

The adhering sheet 30 has the same structure as that of the interleaf sheet 14 and is integrally adhered to the cardboard main body 26 when the moisture-proofing layer 28 is laminated on the cardboard main body 26. When the packaging structure 18 of planographic printing plates has been formed, the protective cardboard 22 is disposed in such a manner that the adhering sheet 30 contacts the interleaf sheet 14. Therefore, the surface of the adhering sheet 30 serves as an interleaf sheet contacting surface 22A of the protective cardboard 22. Further, by the adhering sheet 30 contacting the interleaf sheet 14 in this manner, the coefficient Y of static friction between the protective cardboard 22 and the interleaf sheet 14 becomes equal to or less than the coefficient X of static friction between the interleaf sheet 14 and the image forming surface 10P of the planographic printing plate 10 (i.e., Y≦X).

Table 1 shows relationships between the properties of the respective surfaces of the protective cardboard 22 and the interleaf sheet 14, displacement between the protective cardboard 22 and the interleaf sheet 14 and displacement between the interleaf sheet 14 and the planographic printing plate 10, and damage to the image forming surface 10P of the planographic printing plate 10.

In Table 1, "smooth surface" refers to a surface having a larger Bekk smoothness (defined in JIS P 8119 or ISO 5627), and "rough surface" refers to a surface having a smaller Bekk smoothness, of the surfaces of the interleaf sheet 14.

Further, in cases 1 and 2 in Table 1, LDPE having a thickness of 60 μm is laminated as the moisture-proofing layer 28 on a cardboard main body of a protective cardboard which is generally used, and the adhering sheet 30 having the same structure as that of the interleaf sheet 14 is adhered to the cardboard main body. In case 1, a smooth surface of the adhering sheet 30 serves as the interleaf sheet contacting surface, while in case 2, a rough surface of the adhering sheet 30 serves as the interleaf sheet contacting surface. Moreover, in case 3, a protective cardboard having no adhering sheet 30 adhered thereon is used, and LDPE serving as the moisture-proofing layer 28 is disposed so as to contact, as the interleaf sheet contacting surface, the interleaf sheet 14.

TABLE 1

| items | case 1 | case 2 | case 3 |
| --- | --- | --- | --- |
| Interleaf contacting surface of protective cardboard | smooth surface | rough surface | LDPE |
| protective cardboard contacting surface of interleaf sheet | rough surface | rough surface | rough surface |
| planographic printing plate contacting surface of interleaf sheet | smooth surface | smooth surface | smooth surface |
| displacement between protective cardboard and interleaf sheet | present | present | none |
| displacement between interleaf sheet and planographic printing plate | none | none | present |
| damage to image forming surface | none | none | present |

It can be seen from Table 1 that, when the protective cardboard 22 with the adhering sheet 30 adhered thereon is used (i.e., in cases 1 and 2), displacement is caused between the protective cardboard 22 and the interleaf sheet 14, but there is no displacement between the interleaf sheet 14 and the planographic printing plate 10, and therefore, the image forming surface 10P (i.e., the applied film) of the planographic printing plate 10 is not damaged.

On the other hand, it can be seen that, when the moisture-proofing layer 28 (LDPE) is in contact with the interleaf sheet 14 (i.e., in case 3), the interleaf sheet 14 is displaced relative to the planographic printing plate 10, and therefore, the image forming surface 10P of the planographic printing plate 10 is damaged.

When the smooth surface of the adhering sheet 30 is used as the interleaf sheet contacting surface of the protective cardboard 22 (i.e., in case 1), and when the rough surface of the adhering sheet 30 is used as the interleaf sheet contacting surface of the protective cardboard 22 (i.e., in case 2), damage to the image forming surface 10P can be prevented in both cases. In case 1, in particular, the coefficient of static friction between the protective cardboard 22 and the interleaf sheet 14 is larger than that of case 2. Accordingly, for example, even when a package including planographic printing plates, the protective cardboards 22 and the interleaf sheets 14 is transported under severe conditions or the like, relative displacement between them in the package is not easily caused.

As described above, in the present embodiment, displacement of the interleaf sheet 14 relative to the planographic printing plate 10 is reliably prevented by using the protective cardboard 22 with the adhering sheet 30 being adhered thereon and by setting the coefficient Y of static friction between the protective cardboard 22 and the interleaf sheet 14 so as to be smaller than the coefficient X of static friction between the interleaf sheet 14 and the planographic printing plate 10. Therefore, when the packing structure 18 for the planographic printing plates (see FIG. 2) is transported or the like, even if a force acts on the protective cardboard 22 in a direction of the surface thereof, the interleaf sheet 14 is not displaced relative to the planographic printing plate 10. As a result, the image forming surface 10P of the planographic printing plate 10 is not damaged by friction with the interleaf sheet 14 and is thus reliably protected.

The specific structure for setting the coefficient Y of static friction between the protective cardboard 22 and the interleaf sheet 14 so as to be smaller than the coefficient X of static friction between the interleaf sheet 14 and the planographic printing plate 10 is not limited to the structure in which the adhering sheet 30 is adhered onto the protective cardboard 22. For example, the adhering sheet 30 may not have the same structure as that of the interleaf sheet 14, or the coefficient Y of static friction between the protective cardboard 22 and the interleaf sheet 14 may be set so as to be smaller than the coefficient X of static friction between the interleaf sheet 14 and the planographic printing plate 10 by carrying out, on the interleaf sheet contacting surface of the protective cardboard 22, a processing for decreasing Bekk smoothness so that adherence of the protective cardboard 22 on the interleaf sheet 14 decreases. As shown in FIG. 3, when a paper having the same structure as that of the interleaf sheet 14 is used as the adhering sheet 30, the interleaf sheet 14 can also be used as the adhering sheet 30 without separately manufacturing the adhering sheet 30, and therefore, the protective cardboard 22 according to the present invention can be obtained at a low cost. In this case, since the coefficient Y of static friction can be further decreased, it is preferable that the adhering sheet 30 is adhered onto the cardboard main body 26 so that, of the smooth surface and the rough surface of the adhering sheet 30, the surface having a smaller coefficient of static friction with respect to the protective cardboard contacting surface 14B (this surface is generally a rough surface, but may be a smooth surface if necessary) of the interleaf sheet 14 faces the interleaf sheet 14. (That is, this surface serves as the interleaf sheet contacting surface 22A).

Further, by appropriately determining the surface properties of the interleaf sheet 14 rather than the protective cardboard 22, the coefficient Y of static friction between the protective cardboard 22 and the interleaf sheet 14 may be set so as to be smaller than the coefficient X of static friction between the interleaf sheet 14 and the planographic printing plate 10. In brief, the coefficient of static friction is generally made specific in accordance with a contacting member. Therefore, the surface properties of the protective cardboard 22 or the surface properties of the interleaf sheet 14 may be appropriately determined as long as the coefficient Y of static friction between the protective cardboard 22 and the interleaf sheet 14 turns out to be smaller than the coefficient X of static friction between the interleaf sheet 14 and the planographic printing plate 10.

The coefficient Y of static friction between the protective cardboard 22 and the interleaf sheet 14 is not particularly limited as long as it is smaller than the coefficient X of static friction between the interleaf sheet 14 and the planographic printing plate 10. However, by setting the static friction coefficient Y so as to be a predetermined value or more, displacement between the protective cardboard 22 and the interleaf sheet 14 can be prevented, and therefore, displacement of the package structure 18 of the planographic printing plates during transportation or the like thereof can also be prevented.

Table 2 shows relationships between the coefficient Y of static friction between the protective cardboard 22 and the interleaf sheet 14, the coefficient X of static friction between the interleaf sheet 14 and the planographic printing plate 10, disorder of the packaging structure 18 of the planographic printing plates, and damage to the image forming surface 10P.

TABLE 2

| items | | case 4 | case 5 | case 6 | case 7 |
|---|---|---|---|---|---|
| coefficient of static friction | between protective cardboard and interleaf sheet (Y) | 0.37 | 0.37 | 0.35 | 0.42 |
| | between interleaf sheet and planographic printing plate (X) | 0.50 | 0.37 | 0.52 | 0.36 |
| disorder of packing structure | | none | none | present | present |
| damage to image forming surface | | none | none | none | present |

As can be seen from Table 2, when the coefficients Y and X of static friction are both 0.37 or more (i.e., in cases 4 and 5), disorder of the packing structure is prevented, and damage to the image forming surface 10P is also prevented. On the other hand, when the coefficient Y of static friction is less than 0.37 (i.e., in case 6), damage to the image forming surface 10P is prevented, but disorder of the packing structure is caused. Further, when the coefficient X of static friction is less than 0.37 (i.e., in case 7), disorder of the packing structure is caused. Furthermore, in this case, since the coefficient Y of static friction is larger than the coefficient X of static friction, the image forming surface 10P is damaged.

Accordingly, in order to prevent disorder of the packing structure and damage to the image forming surface 10P, the coefficients X and Y of static friction need to be 0.37 or more.

What is claimed is:

1. An interleaf sheet for planographic printing plates, comprising:
    a planographic printing plate contacting surface, which contacts an image forming surface of a planographic printing plate with an applied film formed thereon in a state in which the planographic printing plate is packaged; and
    an abutting member contacting surface, which contacts an abutting member for planographic printing plates, and which is disposed at a side that is opposite to a side of the planographic printing plate contacting surface,
    wherein surface properties of the planographic printing plate contacting surface and the abutting member contacting surface are respectively determined so that a coefficient of static friction between the abutting member and the abutting member contacting surface is no more than a coefficient of static friction between the planographic printing plate contacting surface and the image forming surface.

2. An interleaf sheet for planographic printing plates according to claim 1, wherein the abutting member includes a main body and a moisture-proofing layer.

3. An interleaf sheet for planographic printing plates according to claim 2, wherein the main body has a density of approximately 0.72 g/m$^3$ and a basis weight of approximately 640 g/m$^2$.

4. An abutting member for planographic printing plates which, in a state in which an interleaf sheet for planographic printing plates is in contact with an image forming surface of a planographic printing plate with an applied film thereon, protects the planographic printing plate by contacting the surface of the interleaf sheet for planographic printing plates opposite to the surface which contacts the image forming surface of the planographic printing plate, said abutting member for planographic printing plates comprising:
    an interleaf sheet contacting surface whose properties are determined such that a coefficient of static friction between the interleaf sheet for planographic printing plates and the abutting member for planographic printing plates is no more than a coefficient of static friction between the image forming surface of the planographic printing plate and the interleaf sheet for planographic printing plates.

5. An abutting member for planographic printing plates according to claim 4, wherein the interleaf sheet contacting surface is formed by adhering an adhering member onto an abutting member main body which forms the abutting member, the adhering member having, with respect to the interleaf sheet, a coefficient of static friction no more than a coefficient of static friction between the image forming surface and the interleaf sheet.

6. A planographic printing plate abutting member according to claim 5, wherein an adhering paper is used as the adhering member, the adhering paper having the same structure as that of the interleaf sheet.

7. A planographic printing plate abutting member according to claim 6, wherein the adhering member is adhered onto the abutting member main body so that a surface of the adhering member which has a relatively low static friction coefficient with respect to the interleaf sheet contacts the interleaf sheet.

8. A planographic printing plate abutting member according to claim 5, wherein the abutting member main body includes a moisture-proofing layer.

9. A planographic printing plate abutting member according to claim 5, wherein the abutting member main body has a density of approximately 0.72 g/m$^3$ and a basis weight of approximately 640 g/m$^2$.

10. A planographic printing plate abutting member according to claim 6, wherein a moisture-proofing layer is laminated on the abutting member main body.

11. A planographic printing plate abutting member according to claim 6, wherein the abutting member main body has a density of approximately 0.72 g/m$^3$ and a basis weight of approximately 640 g/m$^2$.

12. A packaging structure for planographic printing plates, comprising:
    a planographic printing plate;
    an interleaf sheet contacting an image forming surface of the planographic printing plate with an applied film formed thereon; and a protecting member, which protects the planographic printing plate by contacting a surface of the interleaf sheet opposite to the surface of the interleaf sheet contacting the image forming surface of the planographic printing plate, wherein a coefficient of static friction between the protecting member and the interleaf sheet is no more than a coefficient of static friction between the planographic printing plate and the interleaf sheet.

13. A packaging structure for planographic printing plates according to claim 12, wherein an abutting member for planographic printing plates having an interleaf sheet contacting surface is used as the protecting member, the interleaf sheet contacting surface having surface properties which are determined so that the coefficient of static friction between the interleaf sheet and the abutting member is no more than the coefficient of static friction between the image forming surface of the planographic plate and the interleaf sheet.

14. A packaging structure for planographic printing plates according to claim 12, wherein an abutting member for planographic printing plates having an interleaf sheet contacting surface is used as the protecting member, the interleaf sheet contacting surface having surface properties which are determined so that the coefficient of static friction between the interleaf sheet and the abutting member is no more than the coefficient of static friction between the image forming surface of the planographic plate and the interleaf sheet, and wherein the interleaf sheet contacting surface is formed by adhering an adhering member to an abutting member main body which forms the abutting member, said adhering member having, with respect to the interleaf sheet, a coefficient of static friction which is no more than a coefficient of static friction between the image forming surface of the planographic printing plate and the interleaf sheet.

15. A packaging structure for planographic printing plates according to claim 12, wherein an abutting member for planographic printing plates having an interleaf sheet contacting surface is used as the protecting member for planographic printing plates, the interleaf sheet contacting surface having surface properties which are determined so that the coefficient of static friction between the interleaf sheet and the abutting member is no more than the coefficient of static friction between the image forming surface of the planographic plate and the interleaf sheet, wherein the interleaf sheet contacting surface is formed by adhering an adhering member to an abutting member main body which forms the abutting member, said adhering member having, with respect to the interleaf sheet, a coefficient of static friction which is no more than a coefficient of static friction between the image forming surface of the planographic printing plate and the interleaf sheet, and wherein an adhering paper is used as the adhering member, the adhering paper having the same structure as that of the interleaf sheet.

16. A packaging structure for planographic printing plates according to claim 12, wherein a coefficient Y of static friction between the protecting member and the interleaf sheet and a coefficient X of static friction between the planographic printing plate and the interleaf sheet are respectively no less than 0.37.

17. A packaging structure for planographic printing plates according to claim 13, wherein a coefficient Y of static friction between the protecting member and the interleaf sheet and a coefficient X of static friction between the planographic printing plate and the interleaf sheet are respectively no less than 0.37.

18. A packaging structure for planographic printing plates according to claim 14, wherein a coefficient Y of static friction between the protecting member and the interleaf sheet and a coefficient X of static friction between the planographic printing plate and the interleaf sheet are respectively no less than 0.37.

19. A packaging structure for planographic printing plates according to claim 15, wherein a coefficient Y of static friction between the protecting member and the interleaf sheet and a coefficient X of static friction between the planographic printing plate and the interleaf sheet are respectively no less than 0.37.

* * * * *